United States Patent [19]

Silvestri

[11] 4,215,533
[45] Aug. 5, 1980

[54] ROTARY EXPANDER ENGINE

[75] Inventor: Giovanni J. Silvestri, Barrington, R.I.

[73] Assignee: The United States of America as represented by the Secretary of the Navy, Washington, D.C.

[21] Appl. No.: 720,313

[22] Filed: Sep. 3, 1976

[51] Int. Cl.³ .............................................. F02B 53/06
[52] U.S. Cl. ................................. 60/39.63; 418/61 A; 418/161
[58] Field of Search ................... 418/61 A, 61 B, 161; 60/39.61, 39.63

[56] References Cited

U.S. PATENT DOCUMENTS

| 3,012,550 | 12/1961 | Paschke | 418/61 A |
| 3,091,386 | 5/1963 | Paschke | 418/61 A |
| 3,628,899 | 12/1971 | George | 418/61 A |
| 3,687,578 | 8/1972 | White et al. | 418/61 B |
| 3,744,940 | 7/1973 | Pierce et al. | 418/61 A |
| 3,847,514 | 11/1974 | Chen et al. | 418/61 A |
| 4,015,424 | 4/1977 | Shinohara | 60/39.61 |

Primary Examiner—Robert E. Garrett
Attorney, Agent, or Firm—Richard S. Sciascia; Arthur A. McGill; Prithvi C. Lall

[57] ABSTRACT

A low noise, high power, light weight, compact rotary expander engine of the Wankel type which features minimum unbalanced forces and elimination of balance weights because its rotating parts rotate about their centers of mass. The high inertia of its rotating housing eliminates the need for a flywheel and rotation in a plane normal to the centerline of the engine results in a preferential directivity to any residual disturbing forces. The elimination of balance weights and fly wheel provides a means for minimizing clearance volume from the inlet valve to the working space.

12 Claims, 7 Drawing Figures

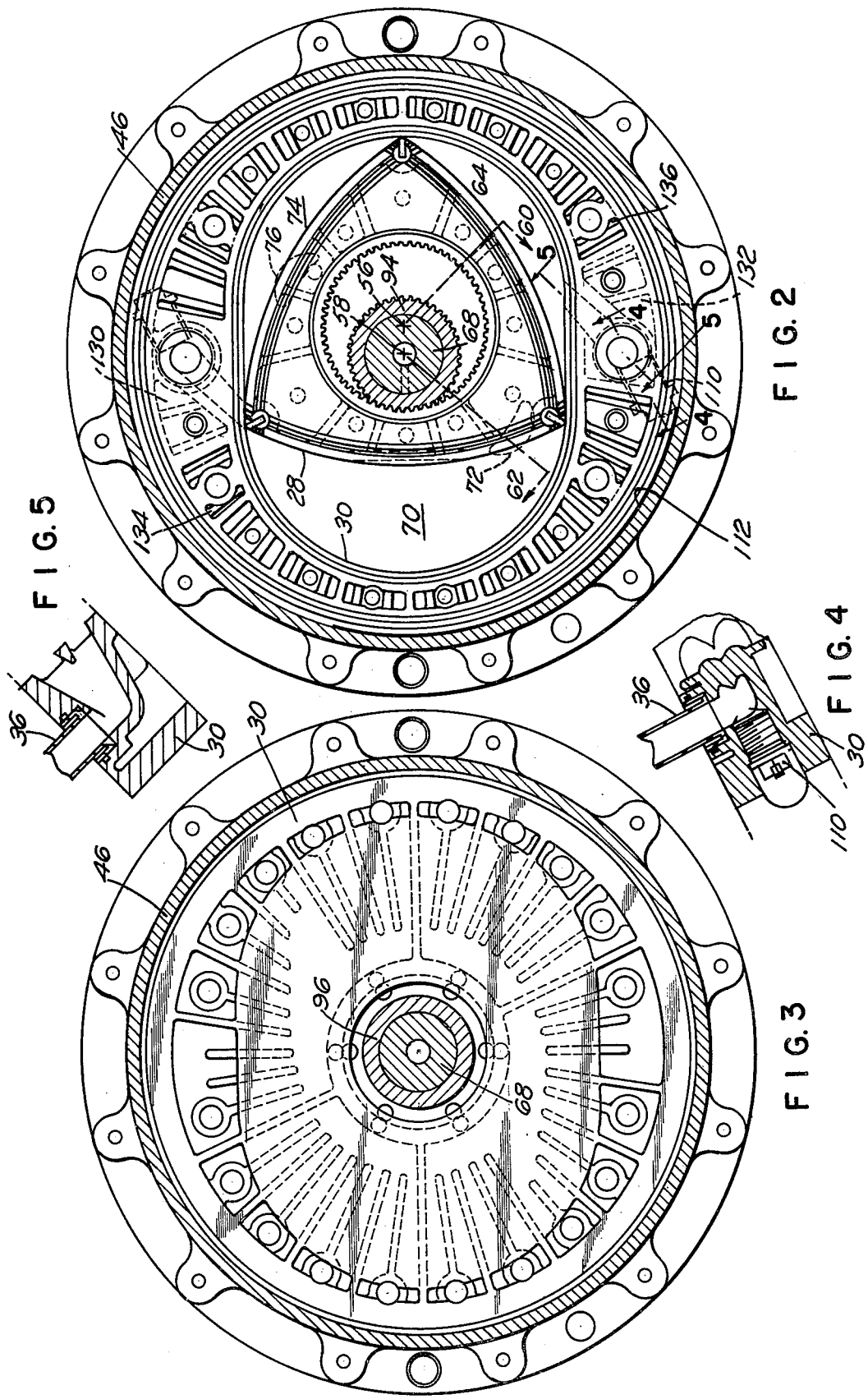

ROTARY EXPANDER ENGINE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This application is co-pending with my three other patent applications, Ser. Nos. 720,314; 720,485; and 720,490 and having the same filing date of Sept. 3, 1976; related to the various aspects of the expander engine.

This invention relates to an expander engine of Wankel type and more particularly to a low noise, high power, light weight and compact expander engine for use primarily in underwater propulsion systems operating with either an open cycle or a closed thermal cycle.

Underwater propulsions systems are generally of three types: a turbine, a reciprocating expander, and an electrical motor battery.

A turbine is basically a steady state machine of high power to weight ratio and high speeds. However, its limitations include high sensitivity of its efficiency to off design speed conditions which must exist in a multi-speed vehicle or require a high ratio variable speed transmission and/or a higher specific fuel consumption at off design than would be required for expander type engines.

The reciprocating expanders presently being used are of the "barrel" configuration with cylinders driving either a cam or swash-plate orientated so that their cylinders move parallel to the axis of the vehicle. Their main disadvantages are that the acceleration of the pistons generates a vibratory force in the most adverse direction and the noise projected as a result seriously limits the vehicles acoustic capabilities. Furthermore, masses of the pistons cannot be perfectly balanced in the axial direction, except by providing opposed cylinders which makes the engine a complicated and large system.

The electric motor battery systems use several types of motors with or without speed reducers and several types of energy sources. However, their main disadvantages include the fact that their power to weight ratio is higher than that of either of the above-mentioned thermal systems and the cost per unit power is also higher. Futhermore, their volume to power ratio is much higher than that for the other two systems.

The use of a Wankel type expander for torpedo or underwater propulsion has been considered previously as described in Pierce et al's, U.S. Pat. No. 3,744,940, assigned to Curtiss-Wright Corporation. The configuration described therein is a Wankel engine operating with pressurized vapor from an external source. The vapor is delivered through two valves for over 90° of crank rotation driven by timing gears causing valve speed to be 0.5 crank shaft speed. These valves are external to the chamber. The crank is driven by a three-lobed rotor which is also rotating in the same direction as and at one third the speed of the crank. The rotor is driven by the expansion of the working vapors delivered to the two-lobed cavities of the stationary chamber. This arrangement makes it difficult to deliver the vapors from an external source without adversely affecting the clearance volume of the engine and hence its performance. Furthermore, this arrangement also results in an unbalanced force from the eccentrically located center of mass of the rotor which must be balanced by eccentric masses attached to the opposite ends of the crank shaft.

It is thus desirable to provide a low noise, high power, light weight and compact expander engine which has the best features of both the turbine engine and the Wankel type engine by virtue of its special features and where all rotating masses rotate about their respective centers of mass and rotation is in a plane perpendicular to the axis of the vehicle, thus, minimizing vibration and noise in the most preferential direction.

SUMMARY OF THE INVENTION

The rotary expander engine which is capable of operating with a low noise, high power and light weight comprises a combustion chamber assembly, a rotating member assembly, a support structure assembly, and an eccentric bearing assembly arranged to mutually cooperate. A charge is ignited in the combustion chamber to obtain a working fluid under high pressure. Alternatively, steam under pressure is delivered to the combustion chamber assembly directly. The working fluid obtained whether by igniting a solid charge in the combustion chamber or obtained directly provides a relative rotational motion of the rotor and the housing member while keeping the crank shaft of the system stationary. The motion of the housing member relative to the rotor and the relationship between the rotating member and the stationary member of the inlet valve fixes the timing of the valve for the intake ports and provides the rotary expansion engine with a continuous output torque in a pre-selected direction. A novel starting method using a starting strip ensures that the expander engine does not rupture resulting from an uncontrolled increase in pressure if the working fluid from the combustion chamber finds the inlet valve closed at the time of starting.

An object of subject invention is to provide a low noise expander engine wherein all masses rotate about their respective centers of mass and rotation is in a plane perpendicular to the axis of the vehicle, thus minimizing vibration and noise with residual disturbances in the most preferential direction.

Another object of subject invention is to have an expander engine which eliminates the need for balance weights which are needed to make delivery of working fluid possible with minimum increase in clearance volume.

Still another object of subject invention is to provide an expander engine which eliminates adverse lateral moments to the crank bearings, thereby providing greater effect of bearing capacity of the crank bearing and permitting use of higher cycle pressures.

Still another object of subject invention is to provide an expander engine which includes an exhaust system which mitigates the only other dominant disturbing force and source of noise by having an exhaust surge chamber as an integral part of the engine.

Still another object of subject invention is to provide an expander which provides a positive means of starting a one chamber machine regardless of the valve position at initiation of the working fluid pressure.

Still another object of subject invention is to have an expander engine which provides means of delivering, circulating, and injecting working fluids including hot gases, lubricants and coolant to and from the rotating chambers.

Other objects, advantages and novel features of this invention will become apparent from the following detailed description of the invention when considered in conjunction with the accompanying drawings wherein:

BRIEF DESCRIPTION OF THE DRAWINGS

FIG. 2 is a cross section of FIG. 1 taken along line 2—2;

FIG. 3 is a cross section along line 3—3 of FIG. 1;

FIG. 4 is a cross section along line 4—4 of FIG. 2;

FIG. 5 is a cross section along line 5—5 of FIG. 2;

DESCRIPTION OF A PREFERRED EMBODIMENT

Figure 1:
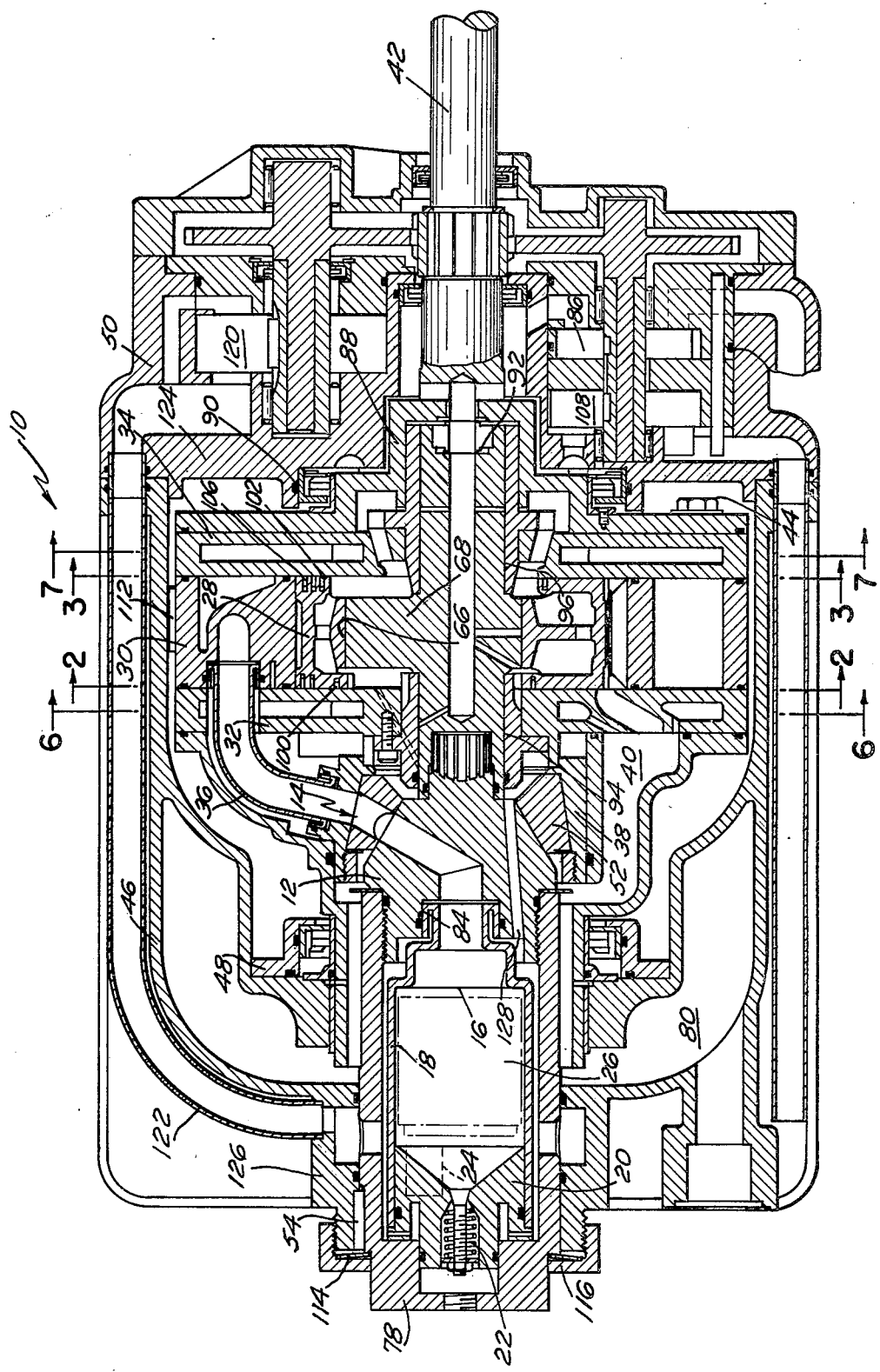
FIG. 1 is a multi-cross sectional view of an expander engine built according to the teachings of subject invention.
Figure 6:
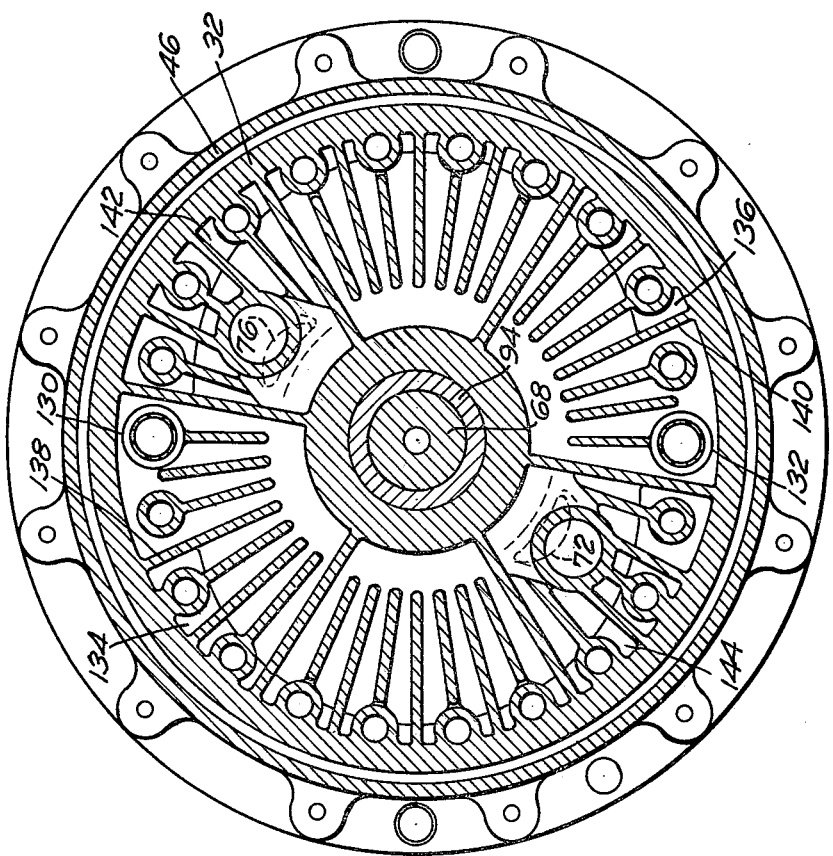
FIG. 6 is a cross section along line 6—6 of FIG. 1.
Figure 7:
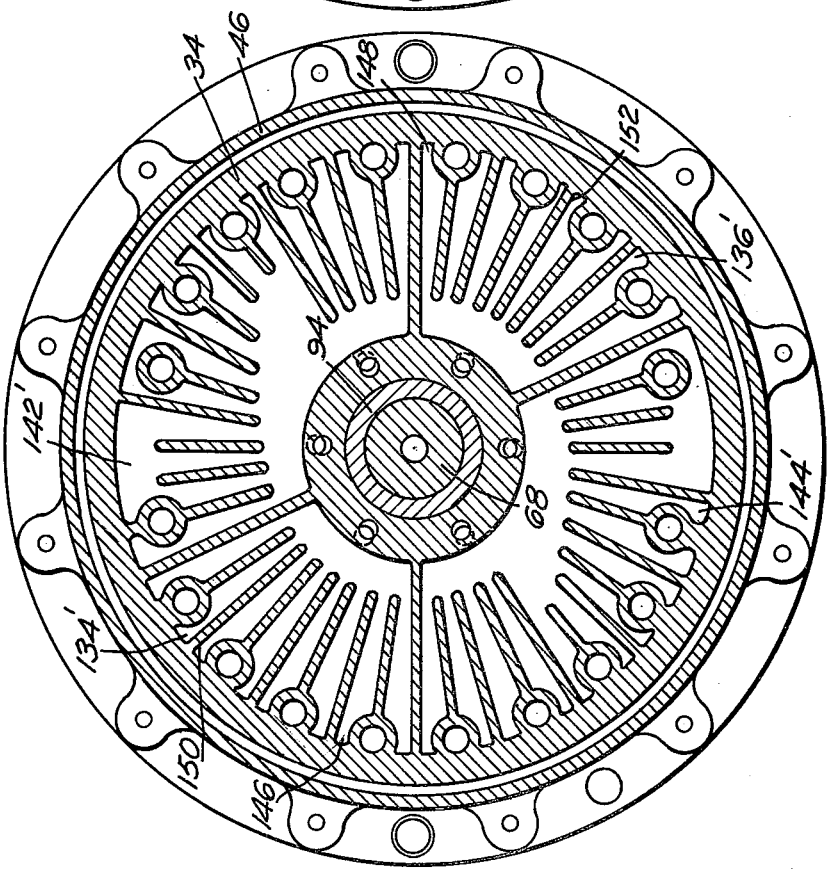
FIG. 7 is a cross section along line 7—7 of FIG. 1.

Referring to the drawings wherein like reference characters designate like parts throughout the several views, and more particularly to FIG. 1 thereof, a multi-cross sectional view of an expander Wankel engine is shown. Expander engine 10 comprises a combustion chamber assembly, a rotating members' assembly, a support structure assembly and an eccentric bearing assembly.

The combustion chamber assembly includes the stationary male part 12 of valve 14, a combustion chamber 16 having inner liner 18 and a combustion chamber head 20. The combustion chamber head 20 includes a pintle valve assembly 22, a start squib 24 embedded in head 20. A starting charge and booster 26 is placed in the combustion chamber 16.

The rotating members' assembly includes a three-lobed rotor 28, a two-lobed epitrochoid housing assembly 30, a forward end plate 32, and after end plate 34, two working fluid transfer pipes (one of these pipes is pipe 36 as shown in FIG. 1), a rotating valve support block assembly 38, exhaust and water manifold assembly 40, output shaft assembly 42, and a plurality of bolts 44. Forward end plate 32 and after end plate 34 and housing assembly 30 and rotor 28 together form the various chambers for the expander engine.

The structural support assembly includes a forward support structure 46, a seal housing structure 48 and an after support plate structure 50, all combined together to form the structural support assembly.

As shown in FIGS. 1-7, the components of the expander engine are put together to cooperate as an expander engine built according to the teachings of subject invention. The operation of the expander engine built according to the teachings of the subject patent application is described as follows:

The engine is started by electrical firing of squib 24 which in turn ignites booster and solid charge 26. Alternatively, if steam is used as a working substance, the steam under pressure is delivered from an external source to the combustion chamber 16 directly. The working fluid is delivered through the male part 12 of valve 14 to the moving valve block 52 which has two annular passages of slightly greater than 90° connecting it to two delivery pipes. Delivery pipe 36, one of these two pipes, is shown in FIG. 1. The male part 12 of valve 14 has only one delivery point and its relative position to the female part 52 of valve 14 is established by the instantaneous position of the housing chamber 30 at any time and is prescribed and fixed relative to ground by position of key 54 as shown in FIG. 1. This establishes the centers of rotation of rotor 28 and housing chamber 30, as shown in FIGS. 1 and 2, at points 56 and 58 in the directions marked by arrows 60 and 62 respectively. With this arrangement the delivery and cut off points in the cycle are established by the female part 52 of valve 14 which is rotating about the fixed male part 12 of valve 14. The working fluid is then delivered alternately through the two delivery pipes to each of the two working chambers via the porting shown in FIG. 5. Chamber 64 in FIG. 2 shows the relative position of rotor 28 and chamber 30 at the point of cutoff or inlet valve closing. The gases in chamber 64 of FIG. 2 expand exerting pressure forces to the walls of rotor 28 and chamber 30 which act through their respective centers of rotation, causing a moment to be exerted between them resulting in a rotation as indicated in FIG. 2. This moment is referenced to ground via the bearing 66 on the fixed crank 68. After 180° of rotation of housing 30 or 120° of rotation of rotor 28, chamber 64 will have expanded to maximum volume and assume the configuration 70 as shown in FIG. 2. At this point the side wall exhaust port 72 will begin to open by virtue of the relative velocity between housing 30 and rotor 28. Exhaust will continue for the next 180° rotation of housing 30 when the volume assumes configuration 74 as shown in FIG. 2. At this point the exhaust valve closes and the remaining volume is compressed to a minimum clearance volume during an additional 90° of housing rotation. The inlet valve 14 as shown in FIG. 1 then opens to deliver the working fluid for approximately 90° of further housing rotation, thereby completing the cycle for one face of rotor 28. During this cycle the housing 30 makes 540° of rotation and the rotor 28 makes 360° of rotation. Hence rotor 28 makes 180° of rotation relative to housing 30 which makes 540° of rotation relative to ground. Each face of rotor 28 functions in the same manner. There are two valves in housing 30. These combined particulars yield two power strokes for one revolution of the rotor 28 or three revolutions of housing 30. Stated differently, the engine has two power strokes per revolution of the output shaft 42.

The expanded gases are delivered through the exhaust ports 72 and 76 of FIG. 2 into the exhaust and water manifold 40 where it mixes with engine cooling water being discharged at the same time. These effluents then proceed to annulus in manifold 40 where they mix and are delivered between 40 and the combustion chamber housing 78 as shown in FIG. 1 to the exhaust surge chamber 80 in support structure 46. This surge chamber is baffled and ported to filter the cyclic pressure pulses in the exhaust before dumping into the ambient environment in order to reduce exhaust contributed ratiated noise.

The cooling water circuit which is described in detail in my co-pending application; Ser. No., 720,485; and of filing date Sept. 3, 1976, is designed to control the temperature of the surfaces exposed to the working fluid and include working chamber walls, combustion chamber, the inlet valve, hot gas delivery pipes, and exhaust etc. The combustion chamber liner 18 is configured to permit the cooling water to surround the O-ring seal 84 at the downstream end so that the temperature of the O-ring 84 never exceeds saturation temperature of the water and effectively seals extreme high temperature gases. This aspect of this particular concept is shown in a greater detail in another of my co-pending patent applications; Ser. No. 720,490 and of filing date Sept. 3, 1976.

The lubricating circuit may be traced as follows: the lubricating oil may be delivered from either an external source or from an integral oil delivery pump 86 in the support structure after end 50 of FIG. 1. If an external source is used, structure 50 is configured with an inlet port and the oil pump and the associate drive is omitted. The oil is directed to an annulus between the after support structure 50 and the output shaft 42. Appropriate dynamics seals between these members prevent leakage between them. The support bearing 88 is lubricated from the aft end, its spent or used oil being discharged on the high pressure side of seal 90 which is at sump pump inlet pressure. The oil is further directed through radial holes in 42 through the center of seal elements 92 to an axial hole in the center of the fixed eccentric 68 from which point it is delivered to the forward and after bearing 94 and 96, the eccentric bearing 66, and into the cavity of rotor 28. Rotor oil seals 100 and 102 minimize oil leakage to the exhaust port. The forward oil seal 100 is of minimum diameter as required to permit the maximum exhaust valve opening without overlapping the valve with the oil seal 100. Since the rotor rotates about its geometric center 56 there is no oil velocity about an instantaneous center causing turbulence within the rotor 28 which is normally experienced with conventional fixed chamber designs. The oil seal 102 and after end rotor bore diameters in the rotor 28 are larger as shown in FIG. 1. Furthermore, there is no exhaust valve on the after end limiting the oil seal diameter to a minimum. The after oil seal 102 is limited to a maximum diameter by a gas seal 106. The difference in diameters of 100 and 102 causes a differential pressure head to exist between the oil delivery (forward side) and the after side of the rotor web. Properly oriented holes or passages in the rotor web allows oil from the high pressure side to the discharge side and ultimately through spill holes in the end plate 34 to the inlet side of the sump pump 108 which may be made integral with support structure 50 or be external driven. Within the rotor cavity a second recirculation is derived from the difference in density between the hot oil at the outermost surfaces of the cavity which is under a pressure resulting from centrifugal effects and the inner surface of the oil at sump pump inlet pressure. Oil boiling at hot wall is inhibited by the centrifugal pressure effects and the cooler heavier oil tends to displace the hot oil.

Since there are only two inlet ports in 52, each of which is open only approximately 90° of rotation of the rotor 28 relative to chamber 30, there exists a 50% chance that at the time of initiation of pressure, Flow cannot exist from the combustion chamber or boiler to the working chamber 30. Under this condition pressures will increase until rupture takes place in the system. This condition is circumvented as follows: a starting squib 110 of FIG. 4 is provided at each of the inlet port sections of FIG. 2 which are electrically fired through a contact strip 112 on FIGS. 1 and 2 which is oriented in the support structure 50 relative to the eccentric position to insure that the pressure is applied to the chamber which finds itself in the expansion part of the cycle. Squib 24 is sized to provide at least half the energy normally delivered to the cycles in operation and firing is initiated from a sensed combustion pressure level.

It should be noted that changes in the dimensions of female part 52 of valve 14 and the dimensions of combustion chamber 16 resulting from thermal strains are compensated by a Belleville spring 114 and nut 116 which serve to maintain minimum but adequate running clearance at valve interface. This aspect is further detailed in another of my co-pending patent applications; Ser. No. 720,314 and of filing date Sept. 3, 1976.

Briefly stated, a rotary expander engine built according to the teachings of subject invention and which is capable of operating with a low noise, high powered and light weight comprises a combustion chamber assembly, a rotating member assembly, a supporting structure assembly and an eccentric bearing assembly. The working fluid in the engine which is obtained either by igniting a solid charge or from an external source provides a relative rotational motion of the rotor and the housing assembly while keeping the crank shaft of the system stationary. The relative motion between the housing member and the rotor and the relationship between the rotating member and that of stationary member of the inlet valve fixes the timing of the valve for the intake ports and provides the rotary expansion engine with a continuous output torque in a preselected direction.

Obviously many modifications and variations of the present invention are possible in the light of the above teachings. As an example, the engine may be configured with two chambers rotating and providing inlet exhaust on both fore and aft plates. In a two chamber configuration the second chamber and eccentric may be oriented 90° out of phase and the inlet valve will deliver four 90° admissions, two at 180° intervals, for the forward chamber at 180° intervals for the after chamber. Furthermore, starting squibs or engine orientation for starting in this configuration will not be required and the admission would be constant. Pressure fluctuation in the combuster and torque fluctuations will be minimized. Furthermore, starting of the engine may be ensured by physically positioning the rotating chamber relative to the housing structure using detents or starting position marks so that an inlet valve will be opened at time of start. In addition, the cooling path and the lubricating paths could be changed to conform to some alternative configurations. It is therefore understood that within the scope of the appended claims the invention may be practiced otherwise than specifically described.

I claim:

1. A rotary expander engine using a working fluid for propulsion comprising:
   a housing member;
   a combustion chamber secured in said housing member and having a first end and a second end;
   an inlet valve having a stationary male part being connected to said combustion chamber at the first end thereof and having an inlet passage acting as a delivery point for the working fluid and a rotatable female part rotatably mounted on said male part and having two inlet passages acting as delivery points therein, the male part and the female part thereof being mounted on a block;
   a housing chamber being rotatably mounted in said housing and rotatable at a first speed relative to said housing and being in communication with the rotatable female part of said inlet valve;
   a rotatable multi-lobed rotor rotatably mounted in said housing chamber, said rotor being rotatable at a second speed relative to said housing member and thus being able to have a second rotational speed relative to said housing chamber, said housing chamber and said rotor forming a plurality of working spaces of changing volumes;

a stationary crank shaft being mounted in said housing;

an output shaft being mounted in said housing and secured to said housing chamber;

a coolant for cooling said housing chamber, said rotor and said output shaft by circulating said coolant therethrough;

means for lubricating said housing chamber, said rotor and said output shaft; and exhaust means for rejecting the exhaust gases and the outflowing coolant.

2. The expander engine of claim 1 which further includes a forward end plate and an after end plate, said forward and after end plates forming said working spaces of variable volumes in cooperation with said housing chamber and said rotor.

3. The expander engine of claim 2 wherein said forward end plate includes exhaust ports being provided therein for discharging exhaust gases therethrough.

4. The expander engine of claim 2 wherein said forward end plate includes passages for the outflowing coolant to pass therethrough.

5. The expander engine of claim 3 wherein said combustion chamber includes a pintle valve assembly mounted therein for controlling the flow of fuel into said combustion chamber.

6. The expander engine of claim 5 wherein said exhaust means includes a surge chamber mounted therein for reducing exhaust radiated noise.

7. The expander engine of claim 5 wherein said lubricating means includes delivery and sump pumps mounted therein.

8. The expander engine of claim 3 wherein said housing member further includes a positioning key mounted therein for providing said housing member as a reference ground for referencing the motion of said rotatable housing chamber, rotatable rotor and the rotatable female part of said inlet valve.

9. The expander engine of claim 2 wherein said combustion chamber further includes a starting squib housed therein.

10. The expander engine of claim 9 wherein said coolant is water.

11. In an expander engine comprising a supporting structure, a combustion chamber housed in said supporting structure, an inlet valve having a stationary male part attached to said combustion chamber and a rotatable female part, a rotatable housing chamber mounted inside said supporting structure, said housing chamber being attached to the rotatable female part of said inlet valve, a pair of input ports in said rotatable housing chamber and being in communication with the rotatable female part of said inlet valve, a rotatable rotor rotatably mounted in said rotatable housing chamber, a stationary crankshaft mounted inside said rotatable housing chamber; an improvement in said expander engine for starting said expander engine regardless of the positions of said rotatable housing chamber and said rotor relative to said pair of input ports; said improvement comprises:

said pair of input ports being located downstream of said inlet valve;

an auxiliary start squib being mounted in one of said pair of input ports;

a contact strip being housed in said rotatable housing chamber; and means for energizing said auxiliary squib.

12. The improvement of claim 11 wherein said starting squib includes sufficient charge for providing at least half the energy normally delivered to said expander in one cycle.

* * * * *